United States Patent Office 3,471,764
Patented Oct. 7, 1969

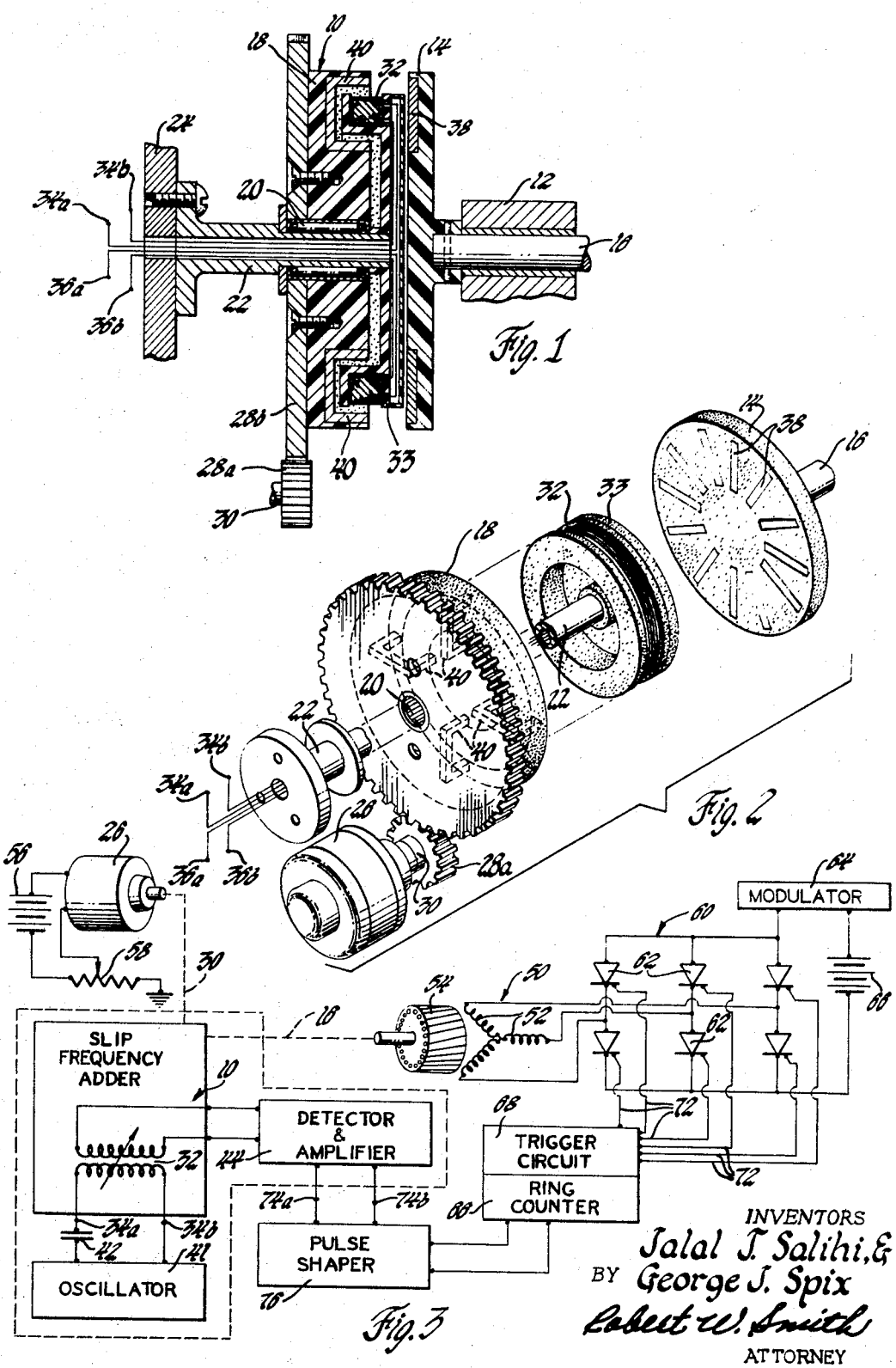

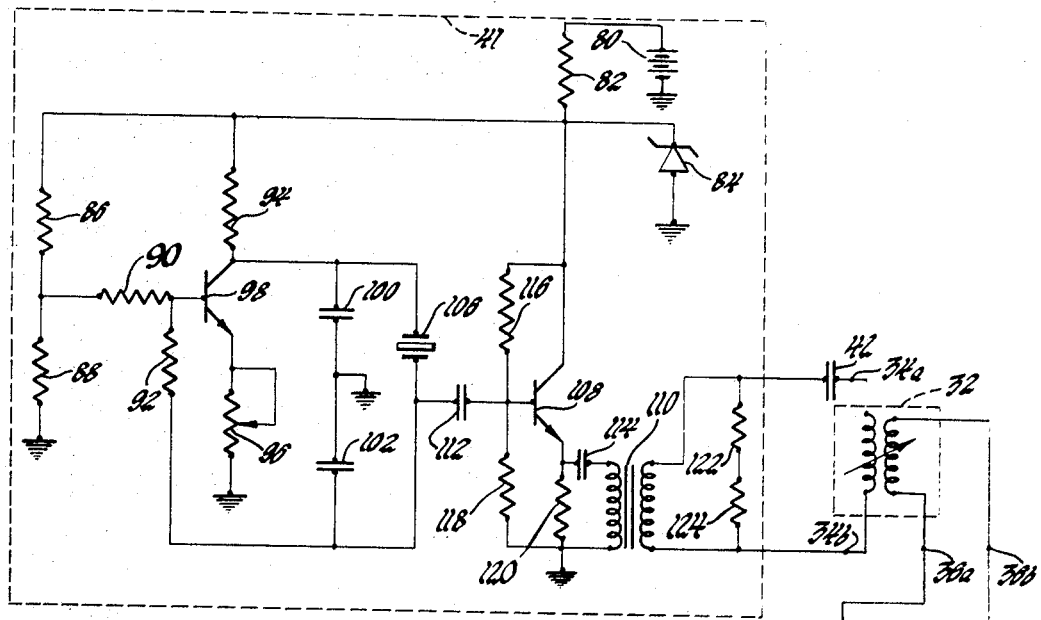

3,471,764
SLIP FREQUENCY COMBINING APPARATUS
Jalal T. Salihi and George J. Spix, Santa Barbara, Calif., assignors to General Motors Corporation, Detroit, Mich., a corporation of Delaware
Filed June 30, 1967, Ser. No. 650,491
Int. Cl. H02p 1/30, 5/34, 7/44
U.S. Cl. 318—231                3 Claims

ABSTRACT OF THE DISCLOSURE

In a preferred form, a frequency combining device is provided with two rotational members including complementary magnetic elements which are respectively rotated adjacent to an inductance coil by a main motor and an auxiliary motor to vary the coil inductance. The coil is connected in a tuned resonant circuit and the relative rotating magnetic elements periodically align to form low reluctance paths in the magnetic field of the coil to thereby modulate the impedance of the resonant circuit at a frequency proportional to the sum or difference of the speeds of the two motors and the number of magnetic elements. Pulse signals produced in the resonant circuit are suitable for controlling the frequency and timing of signals applied to an AC induction motor whereby the speed of the auxiliary motor controls predetermined slip frequencies in the induction motor.

---

This invention is an improvement of slip frequency control systems for squirrel cage induction motors disclosed in application S.N. 295,954 filed July 18, 1963, now Patent No. 3,323,032, assigned to the assignee of this invention.

In the field of induction motor control systems one method employed to control motor speed and torque is by the control of the slip frequency since at any speed the torque of an induction motor is proportional to the slip frequency. As disclosed in the above-identified application S.N. 295,954, these systems employ a power source supplying variable frequency signals to the induction motor. Variable frequency sources utilized include inverter circuits having solid state semiconductor devices controlled by triggering signals which are proportional to the combined motor frequency and the frequency of a separate source of signals which corresponds to the slip frequency. The inverter is triggered in a three phase sequence to produce the motor's synchronous frequency with the motor slip controlled by the slip frequency source.

As disclosed further in the Patent No. 3,323,032, one technique utilized to combine the signals is to combine a source of slip frequency signals with the signals of a tachometer pickup device attached to the induction motor shaft. The amplitude of electromagnetic pickup signals often vary with speed changes and further the signals must be combined in a complicated frequency signal combining circuit. Another technique utilized is to combine the induction motor shaft speed and the speed of a servomotor shaft in a differential gear mechanism and then convert the output of the gear mechanism into an electrical frequency signal in an associated speed sensing circuit.

The present invention resides in a frequency combining apparatus directly producing signals at a frequency related to the combined speeds of two rotating shafts and more particularly to a variable reluctance frequency combining apparatus having rotatable low magnetic reluctance elements connected to rotating shafts to vary the reluctance of magnetic circuits of a coil and therefore the inductance of the coil in accordance with the combined shaft speeds.

Briefly, the slip frequency combining apparatus of the present invention includes a device having a first rotatable member connected to the shaft of a variable speed induction motor and a second rotatable member connected to the shaft of a slip frequency servomotor with both members including low magnetic reluctance elements radially disposed so as to be periodically aligned in the field of a coil to periodically vary the inductive impedance of a tuned circuit frequency sensing circuit. Signals are produced in the sensing circuit having a frequency corresponding to the combined speeds of the first and second rotatable members to thereby combine the induction motor rotor speed and slip frequency servomotor speed and provide a signal for controlling the timing and frequency of a variable frequency power source supplying the motor synchronous frequency.

Accordingly, an object of this invention is to provide a variable reluctance frequency combining apparatus including relatively rotatable magnetic elements which vary the inductance of a coil to produce electrical signals having a frequency controlled by the combined rotational speeds of the elements.

Another object of this invention is to provide a variable reluctance frequency combining device including low reluctance magnetic elements supported and rotated by both the shafts of a main motor and an auxiliary servomotor having a controllable speed.

A further object of this invention is to provide a variable reluctance frequency adding and subtracting apparatus including a first disc rotated by an induction motor and a second disc rotated by an auxiliary servomotor with the discs having complementary low reluctance magnetic elements rotated in the electromagnetic field of an inductance coil to thereby vary the inductance of the coil at a rate corresponding to the sum or difference of speeds of the induction motor and the auxiliary servomotor.

A still further object of this invention is to provide a variable reluctance frequency combining apparatus in a motor power supply to control an AC induction motor and including a first rotatable member having a plurality of low reluctance elements determined by the number of motor poles and a second rotatable member also including a plurality of low reluctance elements complementary to the elements of the first rotatable member to form successive low reluctance paths in the field of an inductance coil connected in a tuned resonant sensing circuit. Variation of the coil inductance due to the speeds of both the first and second rotatable members produces a signal proportional to a predetermined slip frequency and the motor rotor frequency to provide trigger signals for controlling the frequency of a variable frequency power source which supplies power to the AC induction motor.

In the drawings:

FIGURE 1 is a cross-sectional view of the frequency combining apparatus of the present invention.

FIGURE 2 is an expanded isometric view of the present invention illustrated in FIGURE 1.

FIGURE 3 is a schematic block diagram of an AC induction motor power supply system including the frequency combining apparatus of the present invention.

FIGURE 4 illustrates a frequency sensing circuit utilized to detect the inductance changes in the frequency combining apparatus of the present invention.

FIGURE 5 illustrates the wave forms of signals occurring at terminals 34a-34b in the circuit of FIGURE 4.

FIGURE 6 illustrates the wave forms of signals occurring at terminals 74a-74b in the circuit of FIGURE 4.

Referring now to the drawings wherein FIGURE 1 illustrates a cross-sectional view of the variable reluctance frequency combining device 10 of the present invention. A stationary support 12 rotatably supports a first rotatable member including a disc 14 connected to a main shaft 16 suitable for connecting with a first or main motor source of rotation such as the shaft of an AC induction motor. A second rotatable member includes the disc 18 rotatably mounted on bearing 20 on fixed shaft 22 secured to a housing, partially shown at 24, which also supports stationary support 12. As shown in the expanded view in FIGURE 2, disc 18 is rotated by a second or auxiliary servomotor 26 through a gear member 28a mounted on shaft 30 and gear member 28b secured to disc 18. A stationary inductance coil means 32 is wound on a plastic bobbin 33 fixed to the shaft 22 and thereby secured to housing 24. The coil 32 is connected to conductors 34a, 34b, 36a and 36b running through the center of shaft 22 and are, in turn, connected in a frequency sensing circuit described further hereinbelow.

The first and second rotatable members 14 and 18 include discs of non-magnetic material, for example phenolic or plastic compositions, in which elements formed of low reluctance magnetic material, such as ferrite, are imbedded. Ferrite material is preferable to magnetic iron because of its higher quality factor and lower eddy current, hysteresis and residual losses. Twelve ferrite bars 38 cut from ⅛ inch bar stock are mounted in radially aligned pairs equally spaced in disc 14 as illustrated in FIGURE 2. The second disc 18 is axially aligned with the first disc 14 and includes imbedded magnetic elements 40 formed by two pairs of radially mounted "C" shaped ferrite cores arranged to be coacting with bars 38. Accordingly, the ferrite elements 38 and 40 form low reluctance paths when aligned. When using the twelve bars 38, determined as explained further hereinbelow, the number of C-shaped core pairs 40 will only increase the number of parallel low reluctance paths formed and will not change the frequency of the frequency sensing circuit. As can be seen either one, two (shown in FIGURE 2) or up to six pairs of C shaped core pairs regularly arranged can be used to improve reluctance changes. The axial separation between the tips of the C-shaped cores 40 and the bars 38 in one embodiment is approximately an eighth of an inch with the stationary inductance coil means 32 axially disposed between the magnetic elements as illustrated.

With the two rotatable members being rotated in opposite directions, the reluctance of the magnetic field of coil 32 is changed by the periodic alignment of radial pairs of bars 38 with the pairs of C-shaped cores 40 at a rate corresponding to the added speeds of the two discs. Combining of frequencies referred to herein is understood to include adding of the shaft speeds when they are rotated in opposite directions or subtracting when the shafts are operated in the opposite directions. As the reluctance of the magnetic field is varied, a change in inductance of the coil 32 occurs and therefore the impedance of a sensing circuit including the coil is varied. The variation occurs in accordance with the combined speeds of the two rotatable members and the number and mounting arrangement of the ferrite elements.

FIGURE 3 illustrates a schematic diagram of a motor power supply system including the frequency combining apparatus of the present invention which produces pulses in response to the variations in the magnetic circuit and therefore the inductance of stationary inductance coil 32. The coil 32 includes a pair of windings forming a step down transformer and is connected in a frequency sensing circuit illustrated more fully in FIGURE 4. The primary winding coil 32 is connected to terminals 34a and 34b and the secondary output winding is connected to terminals 36a and 36b. Coil input terminals 34a and 34b connect the primary winding of coil 32 in series with a high frequency carrier oscillator 41 and a capacitor 42 which forms a series tuned resonant circuit with the primary winding. The oscillator supplies signals at a frequency of 100 kilohertz which is the resonant frequency of the resonant circuit. The signal from oscillator 41 is amplitude modulated by the change in the resonant circuit reactance due to the periodic changing reluctance and the consequent change in inductance of the coil 32 as illustrated in FIGURE 5. The output of the resonant circuit is taken at terminals 36a–36b and applied to a combination detector and amplifier circuit 44. The detected pulse signals are illustrated in FIGURE 6.

The motor power supply system illustrated in FIGURE 3 corresponds to the system disclosed and described in the above-mentioned patent, with the frequency combining device 10 of the present invention replacing the slip frequency addition control means disclosed in the aforementioned application. The induction motor 50 includes three-phase windings 52 and a squirrel cage rotor 54 connected to the shaft 16 illustrated in FIGURES 1 and 2. The shaft 16 rotates the low reluctance magnetic elements 38 mounted on the non-magnetic disc 14. The auxiliary servomotor 26 is connected by means of the shaft 30 to the second set of low reluctance magnetic elements 40 of disc 18. The auxiliary servomotor 26 is a reversible variable speed DC motor supplied by a DC source 56 and having a variable speed controlled by a potentiometer 58. Also the motor 26 may be a conventional alternating current motor supplied by a small converter with speed control provided by varying the converter voltage. In this power supply arrangement the speed of disc 14 is related to the rotor frequency of motor 50 and the speed of disc 18 is related to a predetermined slip frequency.

A solid state inverter 60, illustrating only the power conducting devices 62, supplies variable frequency signals to the induction motor 60 as described in the aforementioned patent. Power silicon controlled rectifier devices 62 are triggered every sixty electrical degrees in a three-phase sequence. The inverter control includes a voltage modulator 64 for controlling the DC power supplied to the inverter from a DC source 66 which includes a battery, fuel cell or rectified alternating current. Other techniques for modulating such inverters are also well known, for example, phase control and pulse width modulation. The timing and frequency control signals for the inverter 60 are supplied by ring counter and triggering circuits 66 and 68 respectively also described in the aforementioned application. Triggering signals to the inverter trigger inputs 72 are applied at a rate six times the frequency of motor power pulses supplied by inverter circuit 60. The signals for the ring counter circuit 66 are supplied from the frequency sensing circuit at the output of the amplifier and detector circuit 44 at terminals 74a and 74b. These output signals are applied to a pulse shaper circuit 76 which includes a conventional Schmitt trigger circuit.

The triggering signals applied to the inverter 60 from trigger circuit 68 and the ring counter 66 require a frequency six times the synchronous frequency of the motor 50. Accordingly, the pulses at the terminals 74a–74b will be at a frequency six times the motor synchronous frequency. Since the speed of shaft 16 is proportional to the rotor frequency of induction motor 50 and the speed of disc 18 provides the slip frequency, the frequency of pulses at terminals 74a–74b can be equal to the synchronous frequency of the motor 50, although in the system described herein it is multiplied by six times. Conveniently, by means of the present invention, the rotor speed is converted to a rotor frequency in accordance with the equation $$f = \frac{P}{2}\left(\frac{\text{r.p.m.}}{60}\right)$$

the slip frequency is combined to provide the synchronous frequency, and this frequency is multiplied to provide the frequency of trigger pulses required by the inverter 60.

Control of slip frequency of the induction motor 50 is then provided by speed control of slip frequency determining motor 26.

The number of low reluctance elements and speed of the disc 18 driven by motor 26 are explained in a specific example as follows: Assuming a constant but adjustable slip frequency control system for a four pole AC induction motor having a speed of 12,000 r.p.m. and a predetermined slip frequency of 6 c.p.s., utilizing the aforementioned motor equation, the motor synchronous frequency is 400 c.p.s.+6 c.p.s. or 406 c.p.s. It can be seen with 12 bars radially spaced in pairs every 30° around the disc 14, two pairs of bars 38 will align with the two pairs of C shaped elements 40 on disc 18 as the discs rotate. If the speed of motor 26 is zero there will be twelve pulses produced every revolution of disc 14. With the speed of the disc 18 determined as a direct ratio to the speed of disc 14, the motor 26 will turn disc 18 at 180 r.p.m. to produce a slip frequency of 6 c.p.s. Accordingly, the number of low reluctance paths occurring in the field coil 32 will modulate the resonant circuit at a frequency $f$ equal to (number of bars on disc 14)×(speed of disc 14+speed of disc 18)×1/60 or 12×(180 r.p.m.+12,000 r.p.m.)×1/60 or 6 (6+400) which is equal to six times the synchronous frequency of 406 c.p.s. As noted above, the trigger signals from ring counter 66 are to occur every sixty electrical degrees or at a rate 6 times the synchronous motor frequency. This is also the frequency of the modulated signals provided directly from the variable reluctance frequency combining apparatus of this invention. It can be seen if a count-of-three counter is used, the trigger signal frequency of three times the synchronous frequency is provided using three pairs of bars 38.

The above example illustrates the addition of slip frequency and rotor frequency. To provide regenerative braking, disc 18 can be reversed thereby subtracting the slip frequency from the rotor frequency so that the motor input frequency is less than the rotor frequency and brake the motor 50.

Referring to FIGURE 4, a frequency sensing circuit is shown in detail including the series tuned resonant sensing circuit noted hereinabove. Although this circuit is preferable, other known inductance responsive circuit arrangements can be used to sense the variations in inductance of the coil 32, for example, an AC inductance bridge network. The series capacitor 42 and primary winding of coil 32 form a series resonant circuit tuned to 100 kHz. which is the frequency of signals produced by oscillator 41. Oscillator 41 is a known crystal controlled type which is known to be reliable and capable of being mounted in a small space. The oscillator circuit is supplied by a 22 volt DC source at 80.

The values of the oscillator elements are noted as an example only and not limitation as follows:

Resistance 82 _____ohms__    51
Diode 84 _____ Zener type IN720
Resistances:
   86 _____kilohms__   36
   88 _____do____  5.1
   90 _____do____   10
   92 _____do____    1
   94 _____do____    2
Potentiometer 96 _____do____    1
Transistor 98 _____ Type 2N1306
Capacitors:
   100 _____micromicrofarads__ 1500
   102 _____do____  470
Crystal 106 _____ 100 kHz. crystal The output of crystal oscillator 41 is coupled through an impedance matching network including the emitter-follower connected transistor 108 and transformer 110. The low impedance source of oscillator carrier signals is then provided to match the low impedance of the series resonant combination of the primary winding of coil 32 and capacitor 42.

The values of the elements of the impedance matching network are noted as an example only and not as a limitation as follows:

Transistor 108 _____ Type 2N1306
Transformer 110 (70 turns primary and 5 turns secondary).
Capacitors:
   112 _____micromicrofarads__   470
   114 _____farads__    .01
Resistors:
   116 _____kilohms__    30
   118 _____do____  4.7
   120 _____ohms__   620
   122 _____do____    2
   124 _____do____    2

A series tuned resonant circuit was found preferable in providing high resolution of pulses in response to changes of reluctance of the coil 32. A parallel tuned resonant circuit can be used alternatively and the coil 32 can be a single winding coil rather than a two winding transformer coil. In the latter arrangement the output of the resonant circuit is taken from across the capacitance 42.

The amplitude modulated carrier signal illustrated in FIGURE 5 is provided at the coil terminals 36a–36b. To provide discrete pulses the oscillator carrier signal is remevode and the pulses are amplified in the detector and amplifier circuit 44 to provide a series of pulse signals at output terminals 74a–74b. The detector diode bridge includes diodes 130 and the bridge output is applied to the amplifier transistor 144. This circuit is connected to a DC source of 12 volts at terminal 146. The battery 140 and potentiometer 138 control the base bias voltage of transistor 144 to allow adjustment of clipper-action provided in the amplifier circuit.

The signals occurring at output terminals 74a–74b are illustrated in FIGURE 6 and these signals will have a frequency corresponding to the combined shaft speeds times the number of pairs of ferrite bars 38. As noted above in connection with FIGURE 1, six pairs of ferrite bars 34 are shown and therefore the pulses supplied at the output terminals 74a–74b will have a frequency twelve times the combined speeds of the first and second rotatable members 14 and 18 when the two shaft speeds are added.

By way of example and not limitation, the values of the circuit elements shown in the circuit 44 are as follows:

Diodes 130 (4) _____ Diode 1N270
Capacitor 132 _____microfarads__   .02
Resistance 134 _____kilohms__   3.9
Capacitance 136 _____microfarads__   .15
Potentiometer 138 _____ohms__   100
Battery 140 _____volts__  1.5
Resistance 142 _____kilohms__   3.9
Transistor 144 _____ 2N1037

While only one specific embodiment of the invention has been described in detail, it should be obvious there are numerous variations of the apparatus of the present invention. For example, the variable reluctance frequency combining apparatus can be utilized to measure the combined speeds of at least two rotating shafts and utilize the resulting electrical output signals in control systems other than a controlled slip frequency AC induction motor power supply as described herein in detail.

What is claimed is as follows:
1. A motor control system for a polyphase stator winding and a rotor comprising; a source of variable frequency electrical power connected with the stator winding of said induction motor, a tuned resonant electrical circuit including a coil winding, a source of alternating current connected to said tuned circuit, a slip frequency control device having variable output speed, first and second magnetic means driven respectively by the rotor of said induction motor and by said slip frequency control device, said first and second magnetic means being located adjacent said coil winding and operable to vary the in- ductance of said coil winding as a function of the combined speeds of said rotor of said induction motor and the output speed of said slip frequency control device, and means connected between said tuned resonant electrical circuit and said source of variable frequency electrical power for varying the output frequency of said source of alternating current as a function of the varying inductance of said coil winding, the output frequency of said source of alternating current corresponding to the combined speeds of said rotor and of said slip frequency control device.

2. In combination, a variable speed induction motor, a slip frequency control motor, a variable reluctance frequency combining apparatus including first and second rotary shaft inputs and a frequency sensing circuit having output terminals, means coupling said shaft inputs respectively to said induction motor and to said slip frequency control motor, power supply means for applying variable frequency electrical power to said induction motor, frequency control means connected between said frequency sensing circuit output terminals and said power supply means, said frequency sensing circuit including a tuned resonant circuit having an inductance winding and a source of alternating current signals for supplying said tuned resonant circuit, first and second magnetic elements being rotatable about a common axis wherein said axis includes said inductance winding, said first and second magnetic elements being arranged in cooperative relationship so that successive alignment of said magnetic elements varies the inductance of said winding to thereby continuously vary the resonant circuit impedance in response to the combined speeds of said shafts and accordingly control the frequency of said frequency control means and the induction motor synchronous frequency supplied by said motor power supply means.

3. An alternating current motor power supply system comprising: a source of electrical power; a frequency converting circuit connected to said source of electrical power and including power switching devices for supplying three phase power to a three phase alternating current motor means having a rotor output shaft; and a frequency control circuit having an output supplying frequency control signals to the frequency converting circuit; said frequency control circuit including a variable reluctance frequency combining apparatus, a second motor means including an output shaft, and a frequency sensing circuit coupled to the frequency control circuit output, said variable reluctance frequency combining apparatus having a series of radially disposed and circumferentially spaced ferrite bar magnetic elements supported on a first disc means attached to the shaft of said alternating current motor means, a second disc means rotated by said second motor means and including at least one C shaped ferrite magnetic element axially aligned with the ferrite bar elements of said first disc means, an inductance coil, said coil being substantially enclosed by said C shaped ferrite magnetic element and said first disc means thereby providing at least one low reluctance magnetic circuit path relative to said coil when said magnetic elements are mutually aligned, said magnetic circuit path being periodically formed by the combined rotation of said first and said second disc means to thereby periodically vary the inductance of said inductance coil, said frequency sensing circuit including a high frequency carrier oscillator, a series resonant tuned circuit including said inductance coil receiving a high frequency signal from said carrier oscillator, said series resonant tuned circuit providing amplitude modulated signals in accordance with the changes in the inductance of said inductance coil whereby the frequency of control signals applied from said frequency control circuit to said frequency converting circuit are determined by the number of ferrite bar magnetic elements on said first disc and the combined speeds of the output shafts of said alternating current motor means and said second motor means.

References Cited
UNITED STATES PATENTS

| | | | |
|---|---|---|---|
| 2,896,143 | 7/1959 | Bekey | 318—231 XR |
| 3,164,760 | 1/1965 | King | 318—231 XR |
| 3,293,520 | 12/1966 | Lehry | 318—231 XR |
| 3,320,506 | 5/1967 | Humphrey | 318—231 |

ORIS L. RADER, Primary Examiner

G. Z. RUBINSON, Assistant Examiner